United States Patent
Hanten (10) Patent No.: US 9,586,377 B2
(45) Date of Patent: Mar. 7, 2017

(54) BONDING STATION FOR TWO DIFFERENT BONDING PROCESSES

(71) Applicant: Poly-clip System GmbH & Co. KG, Hattersheim (DE)

(72) Inventor: Jürgen Hanten, Bad Nauheim (DE)

(73) Assignee: Poly-clip System GmbH & Co., Hattersheim (DE)

( * ) Notice: Subject to any disclaimer, the term of this patent is extended or adjusted under 35 U.S.C. 154(b) by 512 days.

(21) Appl. No.: 14/158,437

(22) Filed: Jan. 17, 2014

(65) Prior Publication Data
US 2014/0206515 A1    Jul. 24, 2014

(30) Foreign Application Priority Data

Jan. 18, 2013   (EP) ...................................... 13151908

(51) Int. Cl.
| B31F 5/00 | (2006.01) |
| A22C 13/00 | (2006.01) |
| B29C 53/38 | (2006.01) |

(52) U.S. Cl.
CPC ............ B31F 5/00 (2013.01); A22C 13/0003 (2013.01); B29C 53/387 (2013.01)

(58) Field of Classification Search
None
See application file for complete search history.

(56) References Cited

U.S. PATENT DOCUMENTS

| 2,358,455 | A | * | 9/1944 | Hallman | ................. | B29C 53/36 |
| | | | | | | 156/380.1 |
| 2,679,195 | A | * | 5/1954 | Whytlaw | .................. | B31B 1/40 |
| | | | | | | 156/308.4 |
| 2,741,079 | A | * | 4/1956 | Rausing | .................... | B65B 9/12 |
| | | | | | | 222/107 |
| 3,114,301 | A | * | 12/1963 | Reifenhauser | ........ | B29C 47/022 |
| | | | | | | 493/274 |

(Continued)

FOREIGN PATENT DOCUMENTS

| CN | 1590222 A | 3/2005 |
| EP | 0050702 A1 | 5/1982 |

(Continued)

OTHER PUBLICATIONS

Office Action issued in corresponding Chinese Application No. 20140026077.6 dated Jun. 2, 2015 and English translation of same (20 pages).

*Primary Examiner* — Hemant M Desai
*Assistant Examiner* — Tanzim Imam
(74) *Attorney, Agent, or Firm* — Fitch, Even, Tabin & Flannery LLP (57) ABSTRACT

The invention concerns a method and an apparatus for producing a tubular packaging casing, wherein a film web is fed in a feeding direction to forming means for forming a tubular casing having edge areas which extend in the feeding direction and which are arranged adjacent to each other, and wherein the edge areas are bonded together in a bonding station having one bonding tool. Moreover, the bonding tool can be moved in a first and a second working position for (Continued)

carrying out two alternative processes of firmly bonding in one of each of the working positions for bonding the edge areas of the tubular casing together.

16 Claims, 7 Drawing Sheets

(56) References Cited

U.S. PATENT DOCUMENTS

| | | | | |
|---|---|---|---|---|
| 3,385,746 | A * | 5/1968 | Rohn | B29C 53/48 156/204 |
| 3,495,506 | A * | 2/1970 | Plymale | B31C 3/00 156/218 |
| 3,795,081 | A * | 3/1974 | Brown, Jr. | B65B 29/10 493/196 |
| 4,410,011 | A * | 10/1983 | Andra | A22C 13/00 138/118.1 |
| 4,563,792 | A * | 1/1986 | Niedecker | A22C 13/0003 452/31 |
| 7,021,028 | B2 | 4/2006 | Hanten | |
| 7,059,102 | B2 * | 6/2006 | Hanten | A22C 13/0003 53/450 |
| 7,399,264 | B2 * | 7/2008 | Panthofer | B23K 13/025 219/216 |
| 2005/0000190 | A1 * | 1/2005 | Hanten | A22C 13/0003 53/450 |
| 2008/0264515 | A1 * | 10/2008 | Hanten | A22C 11/0245 141/10 |
| 2008/0300121 | A1 * | 12/2008 | Selle | B29C 65/10 493/189 |

FOREIGN PATENT DOCUMENTS

| | | | |
|---|---|---|---|
| EP | 1435791 A1 | 7/2004 | |
| EP | 1474989 A1 | 11/2004 | |
| GB | 595797 A | * 12/1947 | A22C 13/0003 |

* cited by examiner

BONDING STATION FOR TWO DIFFERENT BONDING PROCESSES

This application claims priority to, and the benefit of, European Patent Application No. 13 151 908.4-1655 filed Jan. 18, 2013 with the European Patent Office, which is hereby incorporated by reference.

BACKGROUND OF THE INVENTION

The invention concerns a method and an apparatus for producing a tubular packaging casing according to the preamble of claims 1 and 10. In particular, the invention concerns a method for producing a tubular packaging casing, wherein a film web is fed in a feeding direction to forming means for forming a tubular casing having edge areas which extend in the feeding direction and which are arranged adjacent to each other, and the edge areas are bonded together in a bonding station having at least one bonding tool. Furthermore, the invention concerns an apparatus for producing a tubular packaging casing having film web storage means for accommodating a supply of a film web, forming means for forming a tubular casing out of the film web being fed from the film web storage means in a feeding direction to the forming means wherein the tubular casing has edge areas which extend in the feeding direction and which are arranged adjacent to each other, and a bonding station having one bonding tool.

In the process of producing sausage-shaped products, like sausages, tubular packaging casings are used in which the content of the sausage-shaped products, like meat, adhesive, sealing material and the like is filled in. These tubular packaging casings can be provided in a premanufactured form or can be produced just before the filling process is carried out. In the latter case, a film web is used which is fed to forming means for forming a tubular casing. Subsequently, the edge areas of this just formed tubular casing are bonded together and the so produced tubular packaging caring can immediately be used for filling in the content of sausage-shaped product by a filler. Afterwards, the tubular packing casing filled with the material of the product can be closed on both ends by, for example, a clipping machine.

For producing a tubular packaging casing, a method is known from EP patent application 1 435 791, wherein a film web is formed to a tubular casing the edge areas of which are arranged side-by-side to each other for being bonded together by a heat sealing bar. For that purpose a strip of film is used for overlying the edge areas, wherein said strip of film can be an external one or can be cut from the film web before being formed to a tubular casing. The external or cut film strip is placed over the edge areas of the tubular casing, before the heat sealing bar bonds the edge areas of the tubular casing via the strip of film together to produce a tubular packaging casing.

It is further known from EP patent application 0 050 702 to manufacture tubular packaging casings by bonding longitudinal edge areas of a film web formed in a tubular shape by adhesive bonding. The edge areas are arranged side-by-side or overlap each other, and are bonded by a strip of film, carrying an adhesive layer and being pressed with its adhesive side against the edge areas by a roll.

The addressed prior art shows the disadvantage, that the used bonding process has to be chosen according to the material of the film web used for producing a tubular packaging casing. For example, a cellulosic film material can only be processed by an adhesive bonding using a strip of adhesive wherein the machine for executing this process must be equipped with the respective components, in particular a roller for compressing the edge areas and the adhesive strip together. If, on the other hand, a thermoplastic film material is used the edges areas of which are to be bonded together for producing a tubular packing casing, a heat sealing process has to be applied. The machine for carrying out the heat sealing process must also be equipped with specified components allowing the execution of that method, like a heat sealing bar. Thus, separate machines have to be provided if such different materials are used for producing tubular packaging casings. The provision of different machines is, however, of disadvantage, in particular under an economical point of view since, if the one machine is in line with the other machines for filling and closing the sausage-shaped product, the other is out of operation. Moreover, work space for two machines must be provided.

Therefore, it is an object of the present invention to provide a method and an apparatus for producing a tubular packaging casing which allow the use of different film web materials in an efficient way.

SUMMARY OF THE INVENTION

In case of the method, the above mentioned technical object is solved by the features of claim 1. In particular, the invention provides a method for producing a tubular packaging casing which comprises the steps of: feeding a film web in a feeding direction to forming means for forming a tubular casing having edge areas which extend in the feeding direction and which are arranged adjacent to each other, and bonding the edge areas together in a bonding station having one bonding tool. The bonding tool can be moved in a first and a second working position for carrying out two alternative processes of firmly bonding in one of each of the working positions for bonding the edge areas of the tubular casing together.

Two bonding processes can be performed in one bonding station of one single machine for producing tubular packaging casings. Thus, no separate machines for performing different bonding processes have to be provided. The machine which is able to execute the heat sealing bonding as well as the adhesive bonding is equipped with one bonding tool for performing the two alternative processes. As it will be described later on, the bonding tool can have different designs. In a very simple construction, the bonding tool has one working side which is used for both bonding processes in the two different working positions. The machine performing the inventive method for producing tubular packaging casings is less cost intensive than the provision of two machines. Additionally, the provision of only one bonding machine takes less work space in a production line than the conventional provision of two different machines.

The edge areas of the film web are adjacent to each other, as soon as a forming process, conducted by the forming means, is finished. The formulation adjacent implies, that the edge areas may overlap, or the edges of the edge areas are arranged side-by-side and may or may not contact. Also a film web not being in the form of a straight web but having curly or waved edges is possible. This may be desirable in case the form of the seam shall be designed individually and/or artfully.

The bonding tool provided in the bonding station and being able to carry our two alternative processes of firmly bonding, offers the advantage that bonding processes can quickly be changed according to the desired material which shall be used for the production of the tubular packaging casing. The change in bonding processes does not require additional conversion or reconstruction measures, because the bonding tool is able to perform alternative bonding processes.

In an embodiment of the present invention, the process of firmly bonding is a heat sealing bonding.

With implementation of the heat sealing bonding, materials that are capable of being sealed under the effect of heat may be bonded. Generally, the film web—whose edge areas shall be heat sealed—may at least partially melt under the effect of heat applied by the bonding tool being, for example, in the first working position, and therewith may fuse with each other. It is further possible, that not only the edge areas of the film web itself are partially melted to fuse with each other, but also an additional fuse material, e.g. in form of a strip, that may be placed between overlapping areas of the edge areas or above or below edges of the edge areas that meet or border each other. In another possible alternative, the film web itself or at least its edge areas to be bonded together may be covered by a layer which is predetermined to easily and quickly melt under the effect of heat and fuse with the edge areas, and therefore may support the heat sealing bonding.

The heat—which is used for processing the heat sealing bonding itself—may be applied by a heated bonding tool and may be transferred to the film web to be sealed via convection with the thin air layer which is present between the bonding tool and the film web to be bonded. In another alternative, the heat may be transferred by means of heat radiation, for example generated by a heat generator lamp disposed in the bonding tool.

As mentioned previously, the bonding tool can be arranged in at least two different working positions. The bonding tool, when being in the first working position, bonds the edge areas of the tubular casing together in a contactless manner. In the first working position, the bonding tool in the bonding station processes the heat sealing bonding.

The temperature of the bonding tool may be measured by at least one temperature sensor. The temperature of the firmly bonded edge areas or the edge areas to be bonded right before entering the bonding process may be measured by at least one temperature sensor, too.

In another embodiment of the invention, the process of firmly bonding is an adhesive bonding. For this, an adhesive is needed. The adhesive or glue, respectively, may be already arranged on one or both of the edge areas of the film web to be bonded, or can be provided in form of an adhesive strip, a tape, a pressure and/or temperature sensitive tape or the like. The adhesive may be applied in a liquid state onto the edge areas, right before the edge areas are overlapped and pressed against each other, or right before the edge areas are adapted to meet side-by-side and a strip of film or tape, soaked by any adhesive, is pressed against the edge areas. Obviously, the liquid adhesive may also be replaced by pulverized adhesive, solid crystals of adhesive, or a strip of cold or hot curing adhesive. The adhesive may be a cold curing or a hot curing adhesive. The use of a cold curing adhesive or glue may require means being able to apply pressure directly or indirectly onto the adhesive.

The use of a hot curing adhesive is of advantage, because the heat which is applied in the first bonding process—namely the heat sealing bonding—can directly and additionally be used to cure the adhesive which is placed between the overlapping edge areas, or above or below the edge areas being arranged side-by-side. Also, a cooling station through which the already bonded tubular casing is guidable, may be provided for supporting and/or finishing the curing procedure.

In an aspect of the present invention, the edge areas of the tubular casing to be bonded together may be arranged side-by-side and a strip of adhesive is placed over both edge areas. With the edge areas being arranged side by side, the edges of the edge areas may or may not contact. The strip of adhesive can then be placed over both edge areas. The edge areas being side-by-side may also be placed onto an adhesive tape such that the tape is arranged below the edge areas of the film web. Alternatively, the edge areas of the tubular casing to be bonded together may be arranged one above the other and a strip of adhesive is introduced between both edge areas. With the edge areas arranged one above the other, the edge areas do at least partially overlap.

When the bonding tool is in the second working position, the bonding tool contacts the edge areas of the tubular casing. In the second working position, the bonding tool in the bonding station processes the adhesive bonding. As already mentioned above, the adhesive or glue, respectively, may, for example, be applied onto the film in form of an adhesive strip or tape, in form of powder or crystals, or in form of a liquid or a liquid glob. The bonding tool itself may be capable of contacting and/or pressing the two edge areas of the film web onto each other. The edge areas being side-by-side may also be placed onto an adhesive tape or glue strip such, that the tape is arranged below the edge areas of the film web.

The bonding tool, being in its second working position, is adapted to exert a pressure onto the edge areas of the tubular casing in a direction at least substantially normal to the feeding direction of the film web. The pressure exerted from the bonding tool onto the adhesive and the edge areas in a direct or indirect way supports the curing process in the edge areas laying over each other with the adhesive in between; the distribution of adhesive components may be homogenized in the adhesive material, and the adhesive itself may be activated to apply adhesive gluing forces onto the edge areas as well as cohesive forces in the adhesive itself. This leads to a fluid-tight, inseparable and firmly bonded connection between the edge areas, bonding the tubular packaging casing together.

The amount of pressure exerted by the bonding tool must not be an uniform value, but can vary and can depend on the material of the film web, the used adhesive, the temperature of both, a thickness of the film web, a thickness of the applied adhesive and so on. A pressure sensor can be provided to detect a curing pressure exerted by the bonding tool, to a value which is appropriate for the current state of use. Besides the pressure sensor, also a sensor for detecting the thickness of the film web to be connected in the bonding station may be and provided. This sensor is adapted to output a film thickness signal. The film thickness signal may be used by the controlling device to employ the first and the second working position, respectively.

In another aspect, when the bonding tool is moved from the second working position in the first working position, residuals of the adhesive may be removed from the bonding tool. Potentially present adhesive residuals shall be removed from the bonding tool before the bonding tool is moved, for example, from the second working position in the first working position. Together with a change of working positions, also the bonding process is changed from the adhesive bonding to the heat sealing bonding. In case potentially present adhesive residuals on the bonding tool are not removed before the tool reaches its position for carrying out the heat sealing bonding, the heating of the bonding tool in the working position for heat sealing bonding may involve the production of unhealthy and/or toxic vapors by evaporation of the adhesive residuals. The removal of the adhesive residuals may be done by residual removing means, for example rotating bristles or brushes, grinding means, polishing means, or the like, as well as by an immersion bath the bonding tool is dipped into. Also, the adhesive residuals may be removed by air-pressure, directed onto the bonding tool, in e.g. an air pressure cleaning station besides the bonding station. The step of cleaning the bonding tool may also be executed automatically without interference by the operator, in a semi automatic way after a command is given by the operator, or may be executed manually by the operator. A sensor may be provided, which is adapted to detect the presence of adhesive residuals on the bonding tool, and is further adapted to provide a adhesive residual signal.

In case, the adhesive residual signal indicating that the bonding tool does not have adhesive residuals, a step of cleaning the bonding tool can be omitted.

In case of changing the working positions, the bonding tool can be rotated along its longitudinal axis extending parallel to the feeding direction of the film web. This rotary movement may be performed while changing the working position and bonding procedures, related thereto. The rotary movement of the bonding tool along its longitudinal axis allows the bonding tool to carry more than one bonding means. A heating bar, which is one bonding means, can be provided on the bonding tool along one longitudinal side parallel to the longitudinal axis of the bonding tool. Another bonding means, for example, at least one roller or at least one ball can be placed along another longitudinal side parallel to the longitudinal axis of the bonding tool. The longitudinal side of the bonding tool having the heating bar may have an offset in rotation angle from the longitudinal side of the bonding tool having an at least one rolling element. The heating bar transfers the heat for heat sealing. The at least one rolling element is adapted to put curing pressure onto the edge areas of the tubular casing and the adhesive. As already mentioned above, the bonding tool can be provided in form of a turret or a revolving mechanism. A rotation along its longitudinal axis provides another tool of the bonding tool facing the edge areas of the tubular packaging casing to be bonded.

The rotational position of the bonding tool referred to its longitudinal axis which extends parallel to the feeding direction of the film web, may be controlled by at least one actuator in its first and second working position. The at least one actuator actuating the rotational position of the bonding tool may be controlled by the device for controlling of the machine executing the inventive method.

Alternatively or additionally to the possible rotation of the bonding tool along its longitudinal axis, the bonding tool can be pivoted around its transverse axis extending across the feeding direction of the film web in case of changing the working positions.

An actuator enabling the pivoting movement around the transverse axis of the bonding tool extending across the feeding direction, allows the arrangement of the heating bar for the heat sealing bonding and the one or several elements applying curing pressure onto the edge areas of the tubular packaging casing without problems.

An arrangement like this is further supportive for the removing of detected adhesive residuals from the bonding tool. Means like brushes or bristles for removing adhesive residuals have to contact the surface of the bonding tool onto which adhesive residuals are stuck. If the bonding tool is able to rotate along its longitudinal axis extending parallel to the feeding direction of the film web and/or to pivot around its transverse axis extending across the feeding direction of the film web, the accession for the means for removing adhesive residuals to the bonding tool is facilitated.

In case of the apparatus, above explained problems are solved by the features of claim 10. In particular, the invention provides further an apparatus for producing a tubular packaging casing which comprises a film web storage means for accommodating a supply of a film web, forming means for forming a tubular casing out of the film web being fed from the film web storage means in a feeding direction to the forming means wherein the tubular casing has edge areas which extend in the feeding direction and which are arranged adjacent to each other, and a bonding station having at least one bonding tool. The bonding tool is adapted to be moved in a first and a second working position for carrying out two alternative processes of firmly bonding in one of each of the working positions for bonding the edge areas of the tubular casing together.

The film web may be guided in feeding direction from the film web storage means over guide rollers and/or tension rollers to the forming means. The forming means may be a forming shoulder, the film web is guided over or through. The invention can be used with an apparatus for producing tubular portion packages or sausage-shaped products, respectively, in particular by means of a clipping machine. The tubular packaging casing can be used for sausages, filled with pasty material or sausage meat. For instantaneously filling the currently produced tubular packaging casing, a filling tube may be provided in the clipping machine using the present invention. Thereby, the film web formed by the forming means, may be guided around the filling tube.

The bonding tool, which is provided in the bonding station, may comprise a bar, a rolling element in form of a roller or a ball, and/or any possible combination thereof. Additionally, one bonding tool can provide more than one bonding means, for example in form of a rotatable turret or a rotatable revolving mechanism being able to receive the bonding tools.

In an aspect, the bonding tool which has been moved in the first working position, has a first height measured from the tubular casing in a direction at least substantially normal to the feeding direction of the film web, and the bonding tool which has been moved in the second working position, has a second height measured from the tubular casing in a direction at least substantially normal to the feeding direction of the film web, wherein the second height is smaller than the first height.

The bonding tool in the first working position is adapted to bond the edge areas of the tubular casing by a heat sealing bonding.

In a variant, at least one temperature sensor is provided for detecting the temperature of the bonding tool and/or the temperature of the edge areas of the tubular casing just bonded.

For the control of the temperature to which the bonding tool is heated, also the temperature of the edge areas to be bonded can be determined by a temperature sensor. The measured temperature values can be used for determining the necessary temperature for successfully firmly bonding a connection by the heat sealing bonding.

The bonding tool of the bonding station in the second working position may be able to apply a pressure onto the edge areas of the tubular casing in a bonding process by means of an adhesive bonding using a strip of adhesive for bonding both edge areas of the tubular casing together.

The bonding tool may comprise at least one rolling element which is rotatably held in the bonding tool being in the second working position. The at least one rolling element has a rotating axis being arranged across to the feeding direction of the film web, and is adapted to apply a pressure onto the edge areas of the tubular casing. With the use of at least one rolling element, the bonding tool is able to apply pressure onto the edge areas of the tubular casing to be bonded. The tubular casing, the rolling element puts pressure on, follows a linear movement along the feeding direction. The at least one rolling element provides the advantage that, while exerting pressure onto the edge areas of the film web of the tubular casing to be bonded, the at least one rolling element performs a rolling movement around the rotating axis being arranged across to the feeding direction of the film web. Therewith, the friction between the at least one rolling element and the film web of the tubular casing, the rolling element puts pressure onto, is minimized, because the at least one rolling element is able to follow the linear movement of the tubular casing in feeding direction by an unrolling movement around their rotating axis.

A pressure sensor may be provided for detecting the pressure exerted by the bonding tool onto the edge areas of the tubular casing.

As already mentioned above, the amount of pressure to be exerted by the bonding tool must not be a uniform value, but can depend on various factors. The pressure sensor is provided to detect a pressure exerted by the bonding tool; the sensed pressure is further used for controlling the bonding tool by the device for controlling.

A residual sensor can be provided for detecting the presence of adhesive residuals on the bonding tool wherein the output signal of this sensor, i.e. the adhesive residual signal can be used by a controlling device for controlling the bonding tool to reach its first and/or second working position.

Means can be provided for removing adhesive residuals from the bonding tool.

As already mentioned above, adhesive removing means may be controlled by the device for controlling in an automatic or a semi-automatic way, as well as controlled solely by the operating personnel.

The bonding tool can be moved in the working positions by actuator means which can be controlled by a controlling device separately provided and/or by the controlling device of the whole machine and/or by the controlling device of a machine followed in the production process downstreamed the inventive machine, like for example, a clipping machine, and/or by the controlling device of a machine arranged in the production process upstream the invention machine like, for example, a filler.

Other advantages and embodiments of the present invention shall now be described with reference to the attached drawings. The terms "top", "bottom", "up", "low", "left" and "right" used when describing the embodiments, relate to the drawings orientated in such a way that the reference numerals and name of the figures can be read normally.

DETAILED DESCRIPTION OF THE INVENTION

Figure 1:
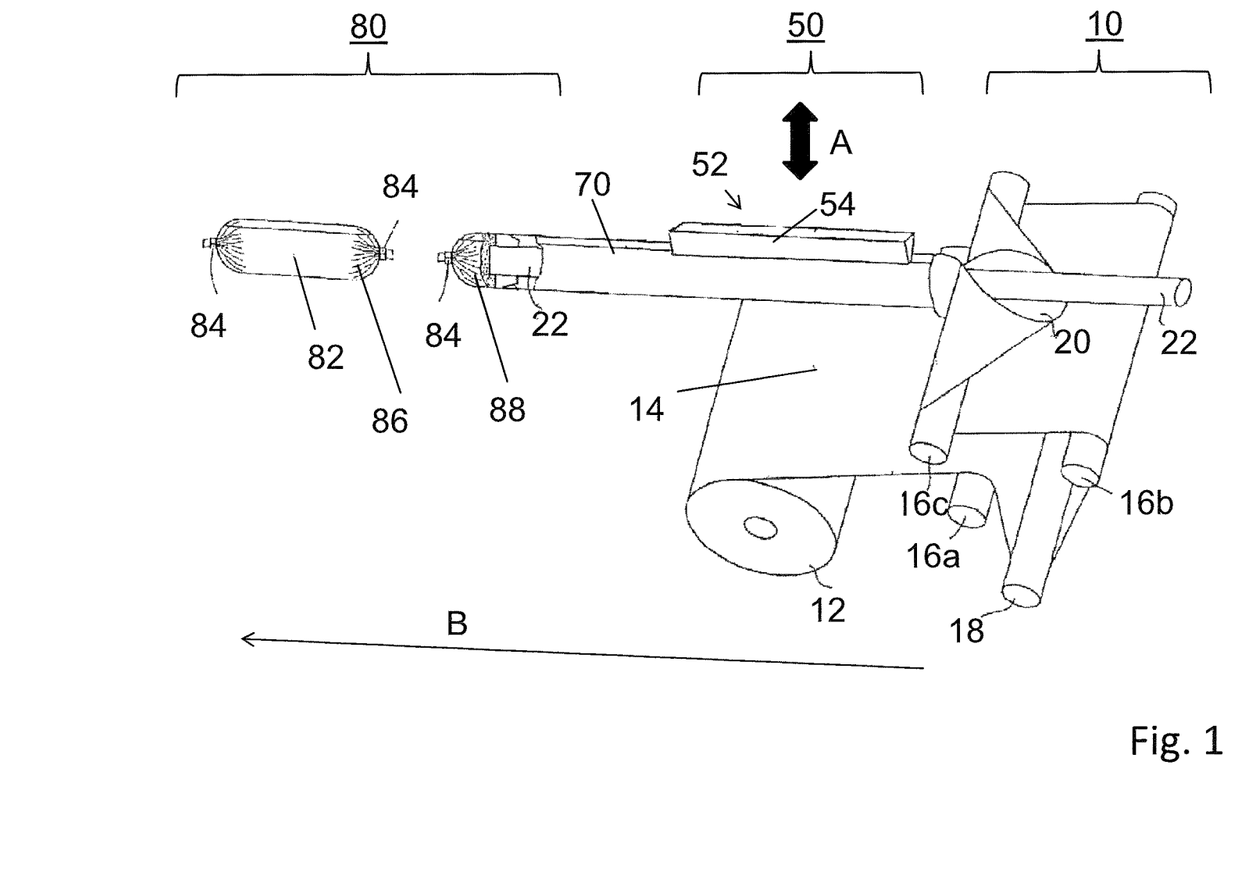
FIG. 1 shows a perspective and schematic view of an inventive apparatus or machine, respectively for producing a tubular packaging casing with a bonding tool according to a first embodiment of the present invention, used in a production line for sausages.

In FIG. 1, a production line for producing sausage-shaped products, like sausages, is shown. The production line comprises a film web providing/forming station 10, a bonding station 50 and a filling and clipping station 80. Film web providing/forming station 10, bonding station 50 and filling and clipping station 80 are arranged along a substantially horizontal feeding direction B of the film web, starting from film web providing/forming station 10 as it can be seen in FIG. 1.

In film web providing/forming station 10, a film web storage means is provided, wherein the film web storage means comprises means for rotatably and exchangeably supporting a film web roller 12. Film web roller 12 provides a film web 14, which is guided over a first guide roller 16a, a tension roller 18, and a second guide roller 16b. Tension roller 18 is adapted to ensure a wrinkle-free pull-off of film web 14 from film web roller 12. Between the means for supporting film web roller 12 and second guide roller 16b film web 14 is fed in a direction opposite feeding direction B.

A third guide roller 16c guides film web 14 over forming means 20. Forming means 20 can be represented by a forming shoulder, which can be adapted to the predetermined size or diameter, respectively, of the tabular packaging casing to be used for the sausage-shaped products. Thus, forming shoulder of forming means 20 may be replaceable. Forming means 20 are arranged around a filling tube 22, and are adapted to form film web 14, which is initially provided by film web roller 12 in form of a flat tape, to a tubular form.

Filling tube 22 guides granular, pulverized or pasty-like material like sausage meat or any other filling material along feeding direction B. The filling material fed through filling tube 22 is guided along feeding direction B, that extends from film tape providing/forming station 10 through bonding station 50 in filling and clipping station 80. Filling tube 22 itself extends through bonding station 50 into filling and clipping station 80. In bonding station 50, edge areas of film web 14, which is formed in a tubular shape after passing forming means 20, are bonded together by means of a bonding tool 52 in order to produce a tubular packaging casing 70. Bonding tool 52 joins the edge areas of tubular formed film web 14 to a tubular packaging casing 70. In filling and clipping station 80, bonded tubular package casings 70 are filled with filling material, provided by filling tube 22 and are closed on both ends by closure means as it is described below.

In filling and clipping station 80, the filling material is fed in tubular packaging casing 70, bonded in bonding station 50. As soon as a predetermined amount of filling material is fed in tubular packaging casing 70, at least one clip 84, preferably two clips 84, may be set at the end of the tubular packaging casing. The clips 84 may be set simultaneously. One clip 84 is adapted to surround tubular packaging casing 70 which has been constricted by at least one displacer (not shown) to a predetermined minimal size. One clip 84 builds an end portion 86 of a sausage-shaped product 82 filled with filing material. Another clip 84 is adapted to build a first end 88 of a new sausage-shaped product to be fed with filling material.

Tubular packaging casing 70 which is produced by bonding the edge areas of tubular formed film web 14 has to be guided in feeding direction B. For that purpose, a feeding element moving tubular packaging casing 70 in feeding direction B may be provided, that moves bonded tubular packaging casing 70 in feeding direction B. As a result of the feeding of tubular packaging casing 70 in feeding direction B, a storage (not shown) of tubular packaging casing 70 can be provided which is disposed around filling tube 22 between bonding station 50 and filling and clipping station 80. The process of filling tubular packaging casing 70 with filling material fed from filling tube 22 and clipping filled tubular packaging casing 70 in filling and clipping station 80 is normally a discontinuous procedure due to the setting of the closure means. The bonding of tubular packaging casing 70 by heat sealing bonding is preferably a continuous procedure. If the heat sealing bonding is performed in a discontinuous procedure, the risk that heating/pressurizing bar 54 would cool down to a temperature no longer suitable for heat sealing bonding, or, on the contrary, would destructively melt tubular packaging casing 70 because of a too long dwell time of the heat applied by bonding tool 52 is not negligible. The bonding of tubular packaging casing 70 by adhesive bonding may be performed in a continuous as well as in a discontinuous procedure. The storage of bonded tubular packaging casing 70 around filling tube 22 between bonding station 50 and filling and clipping station 80 is advantageous. By means of such storing, the combination of the discontinuous filling and clipping of filled tubular packaging casings in filling and clipping station 80 and the preferably continuous process of bonding tubular package casings 70 in bonding station 50 is enabled.

Bonded tubular packaging casing 70 is pulled off from the storage around filling tube 22 by the process of filling the filling material, fed by filling tube 22 in feeding direction B, in tubular packaging casing 70 having first end 88 closed by clip 84.

In FIG. 1, only a symbolic representation of a production line is shown, in the following the present invention will be explained further.

In bonding station 50 of FIG. 1, bonding tool 52 is adapted to perform two different bonding processes. For this purpose, bonding tool 52 is movable in a first and a second working position. The first working position is shown in FIG. 1a, the second working position is shown in FIG. 1b.

In each working position, bonding tool 52 is adapted to perform one bonding process, respectively. Bonding tool 52 is adapted to be risen and lowered in a direction A which is at least substantially normal to feeding direction B. A linear actuator (not shown) is provided, which performs the reversible movement of bonding tool 52 in direction A. A heating/pressurizing bar 54 of bonding tool 52 is adapted to join edge areas of tubular packaging casing by application of heat for performing the heat sealing bonding as well as by applying pressure for performing the adhesive bonding. For that reason, heating/pressurizing bar 54 may be heated or pressed against an object, in particular against the edge areas of film web 14, formed to tubular packaging casing 70 to be bonded.

Bonding tool 52 provided in bonding station 50 performs the task of bonding the edge areas of tubular shaped film web 14 together. Bonding tool 52 comprises heating/pressurizing bar 54 that has a longitudinal axis T, as shown in FIG. 1a. Heating/pressurizing bar 54 is arranged such that its longitudinal axis T is parallel to feeding direction B.

Figure 1A:
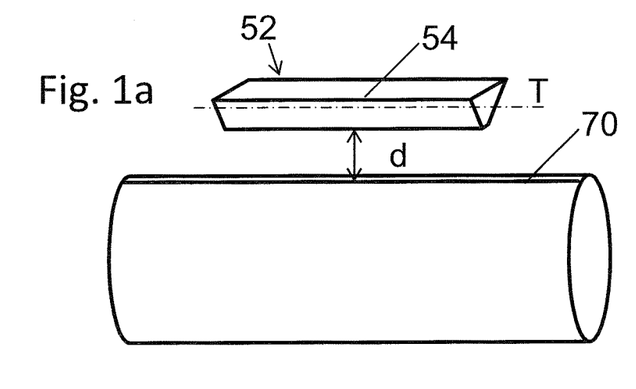
FIG. 1a shows the bonding tool of FIG. 1 in its first working position.
Figure 1B:
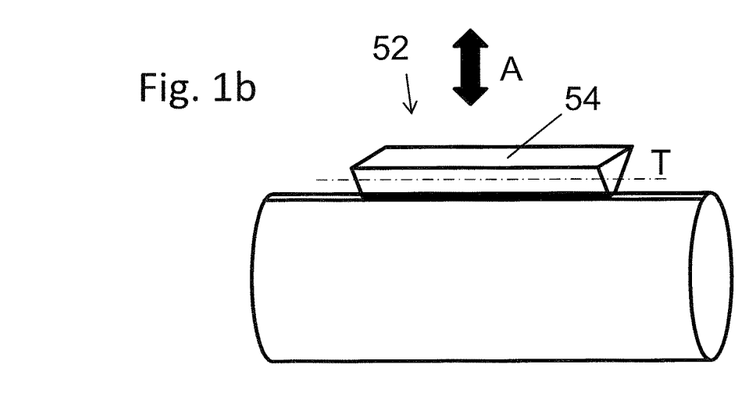
FIG. 1b shows the bonding tool of FIGS. 1 and 1a in its second working position.

In the first working position of bonding tool 52 as shown in FIG. 1a, bonding tool 52 is capable of performing a heat sealing bonding. By heat sealing, materials that are capable of being sealed under the effect of heat may be bonded. Heating/pressurizing bar 54 is capable of being heated up to a melting temperature of tubular formed film web 14 to be bonded. Bonding tool 52, together with heating/pressurizing bar 54, is lowered to the region of film web 14 to be bonded by heat sealing. The temperature, bonding tool 52 with heating/pressurizing bar 54 is heated onto and a distance d, bonding tool 52 is kept away from the edge areas of tubular packaging casing 70 to be bonded, depends on the kind of material of film web 14 and a thickness of film web 14. If an additional fuse material is used for the bonding process of heat sealing, not only the edge areas of film web 14 itself are partially melted to fuse with each other, but also an additional fuse material. Thus, also the usage of additional fuse material is an influencing factor for the temperature applied by bonding tool 52—in particular by heating/pressurizing bar 54. The amount of distance d may be controlled by a controlling device (not shown).

In the second working position as shown in FIG. 1 b, bonding tool 52—in particular heating/pressurizing bar 54—is capable of performing an adhesive bonding. The position of bonding tool 52 corresponds to the position of bonding tool 52 as shown in FIG. 1. Therein, bonding tool 52 exerts curing pressure onto a hot or cold curing adhesive being placed on the edge areas of film web 14 in form of a strip, a fluid or the like. In particular, the adhesive strip can be externally guided. The adhesive strip may further be pulled off from a strip spool arranged next to bonding tool 52, or may be applied onto the edge areas in a forming process, performed in forming means 20. Alternatively, as can be seen in FIG. 1, the glue or adhesive layer can be provided directly with film web 14, itself. The curing pressure, heating/pressurizing bar 54 applies onto the adhesive strip arranged between the edge areas or stuck on the edge areas below or above them when being arranged side-by-side, depends on a thickness of film web 14, the amount of adhesive used, the kind of adhesive, the temperature of adhesive and film web 14 etc. The thickness of film web 14 to be bonded is detected by a sensor (not shown), that provides a thickness signal.

The change of working positions from the first to the second working position, which means from bonding film web 14 by heat sealing to bonding film web 14 by adhesive bonding, is executed by means of some steps as it will be described below. In general, while performing the heat sealing bonding, bonding tool 52, in particular heating/pressurizing bar 54, is not in contact with film web 14 (see FIG. 1*a*), and furthermore is heated up to a temperature suitable for at least partially melting the edge areas of tubular packaging casing 70 to be bonded. Therewith, the temperature of bonding tool 52 while performing is higher than ambient temperature. Bonding tool 52 should therefore not be contaminated with residuals of the adhesive to keep bonding tool 52 away from evaporating residuals stuck thereon. Nevertheless, a sensor is provided to detect any contamination on bonding tool 52. In case the sensor detects any contamination, this may be removed manually, semi-automatically or automatically controlled by the device for controlling or the control device, respectively. The device for controlling further assures, that bonding tool 52 is cooled down to such a temperature, that film web 14 does not stick onto bonding tool 52, as soon as bonding tool 52—in particular heating/pressurizing bar 54—contacts film web 14. For that purpose, a cooling station may be provided (not shown) which may be an air blower. Subsequent, the device for controlling controls the actuator to lower bonding tool 52 onto the edge areas of tubular packaging casing 70 to be bonded. As soon as bonding tool 52 is lowered onto tubular packaging casing 70 to be bonded, bonding tool 52 exerts curing pressure onto the edge areas that are provided with an adhesive. Bonding tool 52 then resides in the second working position.

Figure 1C:
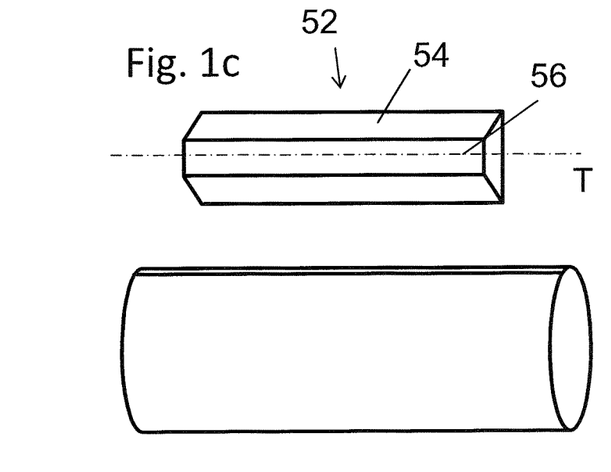
FIG. 1c shows the bonding tool being in a position used for changing working positions.

For changing working positions from the second working position (see FIG. 1*b*) to the first working position (see FIG. 1*a*), bonding tool 52 is moved in direction A normal to feeding direction B of film web 14 away from film web 14 by the actuator that guides bonding tool 52. The presence of adhesive residuals on bonding tool 52 is detected. This is done by means of the sensor detecting any contamination on the tool. In the present case, this sensor detects the presence of adhesive residuals, and provides an adhesive residual signal to the device for controlling. Depending from the adhesive residual signal, adhesive residuals are removed from bonding tool 52, until the adhesive residual signal indicates a successful removal. The removal of adhesive residuals is done by means of a brush (not shown) being controlled by the device for controlling. Therefore, bonding tool 52 is moved further in direction A away from film web 14 and rotated around its longitudinal axis T being parallel to feeding direction B, to allow the brush to come into contact with a contact surface 56 of bonding tool 52 contacting film web 14 while performing the adhesive bonding (see FIG. 1*b*). A possible end-position of bonding tool 52 for removing adhesive residuals by brushing bonding tool 52 is shown in FIG. 1*c*. The device for controlling controls the temperature of bonding tool 52. Bonding tool 52 is then moved further, as soon as the predetermined temperature for heat sealing a chosen film web material, and controlled by the device for controlling, is reached. Initially, the rotation around the longitudinal axis of bonding tool 52 for removing any adhesive residuals by brushing is reversed. Bonding tool 52 is then guided in direction A normal to feeding direction B towards tubular packaging casing 70 by the at least one actuator being controlled by the device for controlling until the first working position is reached.

Figure 2:
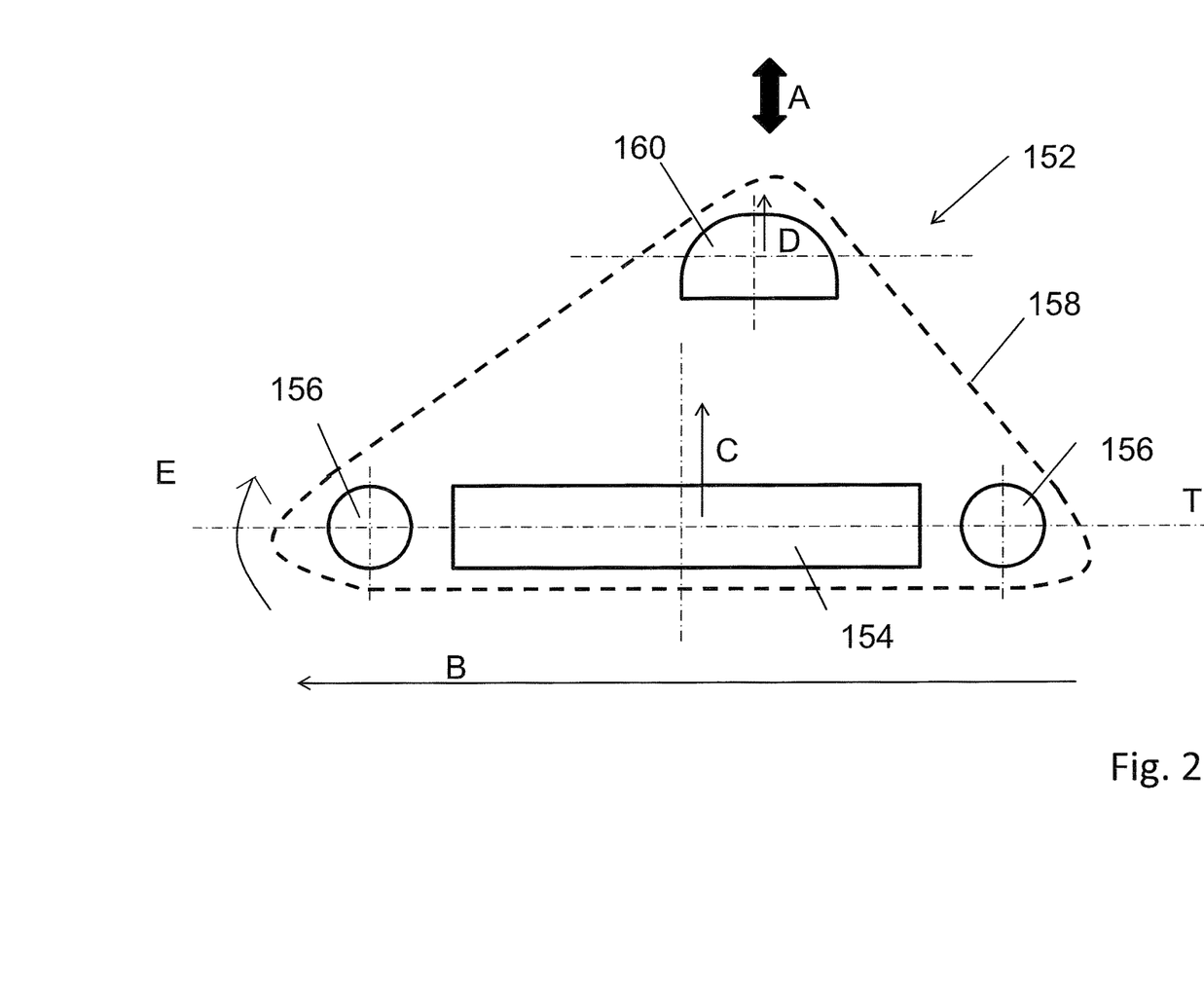
FIG. 2 shows in a schematic view a bonding tool according to a second embodiment of the present invention.

In FIG. 2, a second embodiment of the present invention is shown. A bonding tool 152 according to the second embodiment can be used in a production line for producing sausages-shaped products, like sausages, as shown in FIG. 1. Bonding tool 152 comprises an elongated heating/pressurizing bar 154, having a longitudinal axis T, wherein axis T is parallel to feeding direction B. Heating/pressurizing bar 154 is flanked along feeding direction B by two guide rollers 156, wherein heating/pressurizing bar 154 and guide rollers 156 are surrounded by a heating/pressurizing tape 158. Guide rollers 156 may be in mesh with heating/pressurizing tape 158, that is tensioned by a tension element 160. Tension element 160 is able to perform a temperature compensation which is needed as soon as bonding tool 152, in particular heating/pressurizing bar 154, is heated up. Guide rollers 156 are rotatably connected to a backplate (not shown). Heating/pressurizing bar 154 is linearly moveably connected to the backplate, such that heating/pressurizing bar 154 may move along a linear direction C, independent from a movement of the backplate along a backplate movement direction A by means of a linear actuator being attached to the backplate. A movement of the backplane along direction A, which is substantially normal to feeding direction B, moves bonding tool 152 altogether. Direction C is parallel to direction A.

Tension element 156 is linearly moveably connected to the backplate, too, wherein tension element 156 may move along direction D. Tension element 156 may be tensioned by a spring (not shown) in a direction away from heating/pressurizing bar 154, at least substantially normal to the middle axis of filling tube 22. Bonding tool 152 can be moved away from—or lowered onto the edge areas of tubular packaging casing 70 to be bonded. In case bonding tool 152 is lowered, bonding tool 152 is actuated by the linear actuator in direction A towards film web 14 to be bonded.

If bonding tool 152 is the second working position, heating/pressurizing tape 158 contacts the edge areas of tubular packaging casing 70 to be sealed for performing the adhesive bonding. Heating/pressurizing bar 154, which is moveable along direction C independently from any movement of bonding tool 152, puts pressure on heating/pressurizing tape 158. Heating/pressurizing tape 158 follows the movement of film web 14 onto which heating/pressurizing tape 158 is pressed, in feeding direction B. This leads to a rotating movement of heating/pressurizing tape 158 in a tape moving direction E, wherein heating/pressurizing tape 158 surrounds guide rollers 156, tension element 160 and heating/pressurizing bar 154 continually. Therefore, it may be supportive, that heating/pressurizing tape 158 meshes with at least one rotatable guide roller 156, wherein at least one guide roller 156 may be driven externally.

In case, at least one guide roller 156 is driven externally, an additional feeding element—as explained together with FIG. 1 above—can be omitted, because at least one externally driven guide roller 156 drives via a meshing connection heating/pressurizing tape 158—and thereby also film web 14 or tubular packaging casing 70 along feeding direction B.

When performing the adhesive bonding, bonding tool 152, which is in the second working position, is in contact with the edge areas of tubular packaging casing 70 to be bonded. The adhesive bonding of the edge areas of tubular packaging casing 70 is performed such, that heating/pressurizing tape 158 is pressurized by heating/pressurizing bar 154. Therewith, heating/pressurizing tape 158—when being pressurized by heating/pressurizing bar 154, itself—exerts pressure on the edge areas of tubular packaging casing 70 to be bonded. This pressure exerted onto the edge areas supports the curing effect of the adhesive applied onto the edge areas or between the edge areas of tubular packaging casing 70.

When performing the first bonding process, bonding tool 152 is in the first working position for heat sealing. Bonding tool 152, in particular heating/pressurizing tape 158, is shifted a distance away from tubular packaging casing 70 to be bonded. The device for controlling controls heating/pressurizing bar 154 such, that heating/pressurizing bar 154 is heated up to a temperature suitable for performing the heat sealing bonding. As a result of this, heating/pressurizing tape 158 is heated up by heating/pressurizing bar 154, too, wherein heating/pressurizing tape 158 may or may not movingly surround guide rollers 156 and tension element 160 by moving in tape moving direction E. The device for controlling controls the maximum temperature heating/pressurizing bar 154 is heated onto, as well as distance d, film web 14 to be sealed and bonding tool 152 are spaced apart in direction A normal to the middle axis of filling tube 22.

In case, the bonding process shall be changed from bonding by heat sealing to adhesive bonding, this can be performed as already explained together with FIG. 1. Bonding tool 152 of the second embodiment of FIG. 2 is moved in direction A normal to feeding direction B towards the edge areas of tubular packaging casing 70 to be bonded. This movement as well as the temperature of bonding tool 152 and the pressure exerted by bonding tool 152 onto film web 14 to be bonded is controlled by the device for controlling, as already explained for FIG. 1 above. The temperature of bonding tool 152 is controlled, because it is possible to use hot as well as cold curing adhesives for bonding the edge areas.

In case, the bonding process shall be changed from bonding by adhesive bonding with bonding tool 152 being in the second working position to bonding by heat sealing bonding with bonding tool 152 being in the first working position, some steps need to be performed. These steps correspond to the steps already explained with FIG. 1 above.

As already mentioned above, too, the position of bonding tool 152, in particular distance d (see FIG. 1a, above) bonding tool 152 is spaced apart from tubular packaging casing 70 to be bonded, is controlled by the device for controlling.

Figure 3:
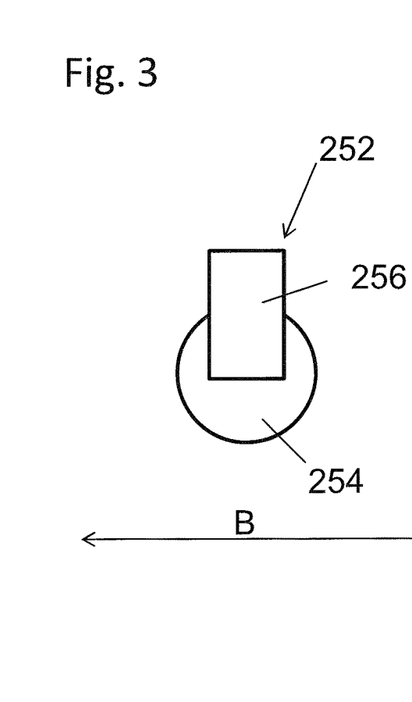
FIG. 3 shows in a schematic view a third embodiment of a bonding tool according to the present invention.
Figure 3A:
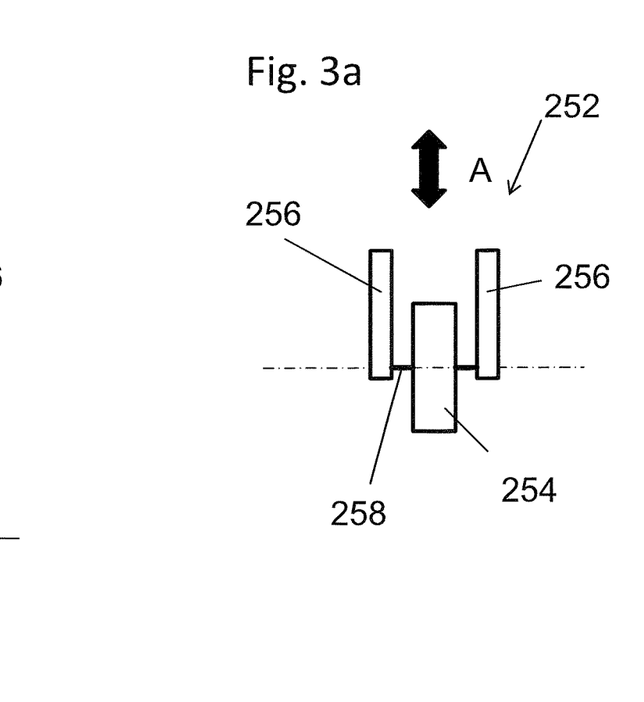
FIG. 3a shows a side view of the embodiment of FIG. 3.

FIG. 3 shows a third embodiment of the present invention. FIG. 3a, shows a side view of FIG. 3. A bonding tool 252 comprises a rolling element in form of a heating/pressurizing roller 254, that may be heated up onto a temperature when being in the first working position for performing the heat sealing bonding. In its second working position, bonding tool 252, in particular heating/pressurizing roller 254, may be pressed against an object against which heating/pressurizing roller 254 can roll of. At least one guide lever 256, in particular two guide levers 256, is/are adapted to hold heating/pressurizing roller 254 by means of a roller shaft 258. Roller shaft 258 represents the axis of rotation of heating/pressurizing roller 254, and enables a rolling movement of heating/pressurizing roller 254 independent from rotationally rigid guide levers 256. Bonding tool 252 can be moved at least along direction A being substantially normal to feeding direction B by means of the actuator moving bonding tools 52 and 152 as already introduced with FIGS. 1 and 2. Furthermore, the at least linear movement of bonding tool 252 along direction A is controlled by the device for controlling.

In case, bonding tool 252 is in the first working position and performs the heat sealing bonding, heating/pressurizing roller 254 is heated up onto a temperature controlled by the device for controlling, wherein heating/pressurizing is spaced apart by distance d from the edge areas of tubular packaging casing 70 to be bonded. The maximum temperature heating/pressurizing roller 254 is heated onto, depends—as already introduced for bonding tools 52 and 152—from the material of film web 14, the presence of an additional sealing tape, the thickness of film web 14, from distance d bonding tool 252 is apart from tubular packaging casing 70 etc.

The change of working positions for the third embodiment of the present invention follows the procedure already explained for the first and second embodiment.

Figure 4:
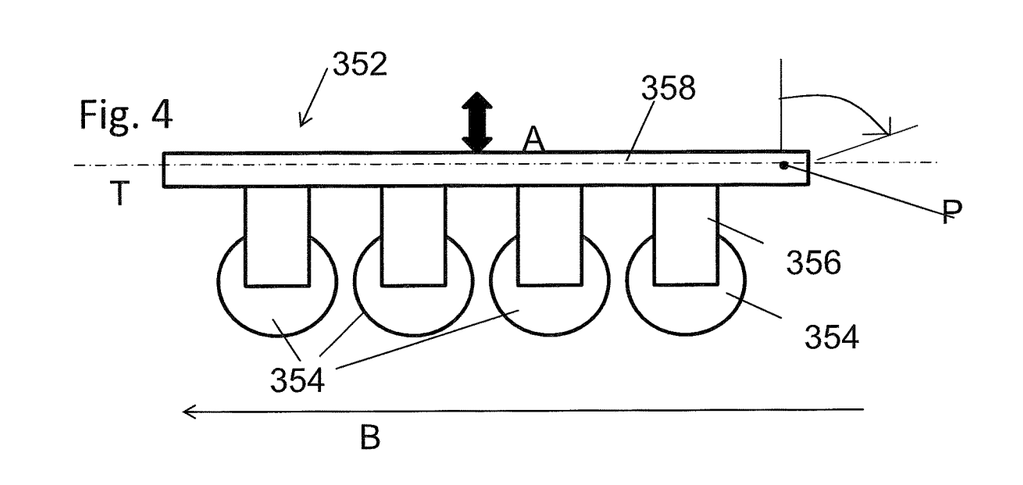
FIG. 4 shows in a schematic view a fourth embodiment of a bonding tool according to the present invention.
Figure 4A:
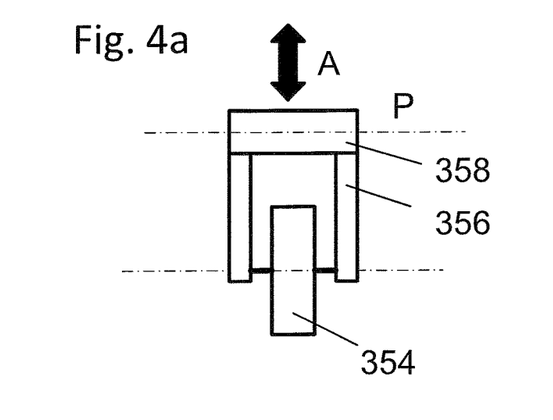
FIG. 4a shows a side view of the embodiment of FIG. 4.

In a fourth embodiment of the present invention as shown in FIG. 4, a bonding tool 352 provides at least two rolling elements. As can be seen in FIG. 4, four heating/pressurizing rollers 354 are part of bonding tool 352. FIG. 4a shows a side view of FIG. 4. At least one guide lever 356 is provided for heating/pressurizing rollers 354, each. Guide rollers 356 are bound together by a guide bar 358 having longitudinal axis T being parallel to feeding direction B. Guide bar 358 is pivotably moveable around a pivoting axis P being transverse to longitudinal axis T of bonding tool 352 by a pivoting actuator (not shown). Bonding tool 352 is moveable along direction A substantially normal to feeding direction B by means of the actuator as already explained with FIGS. 1 to 3. In general, the change of working positions from the first to the second working position and vice versa follows the proceedings as already introduced with FIGS. 1 to 3, too. Additionally, the pivoting movement of bonding tool 352 around pivoting axis P by means of the pivoting actuator allows easy accessibility to heating/pressurizing rollers 354 for the cleaning brushes in order to remove potentially present adhesive residuals.

Figure 5:
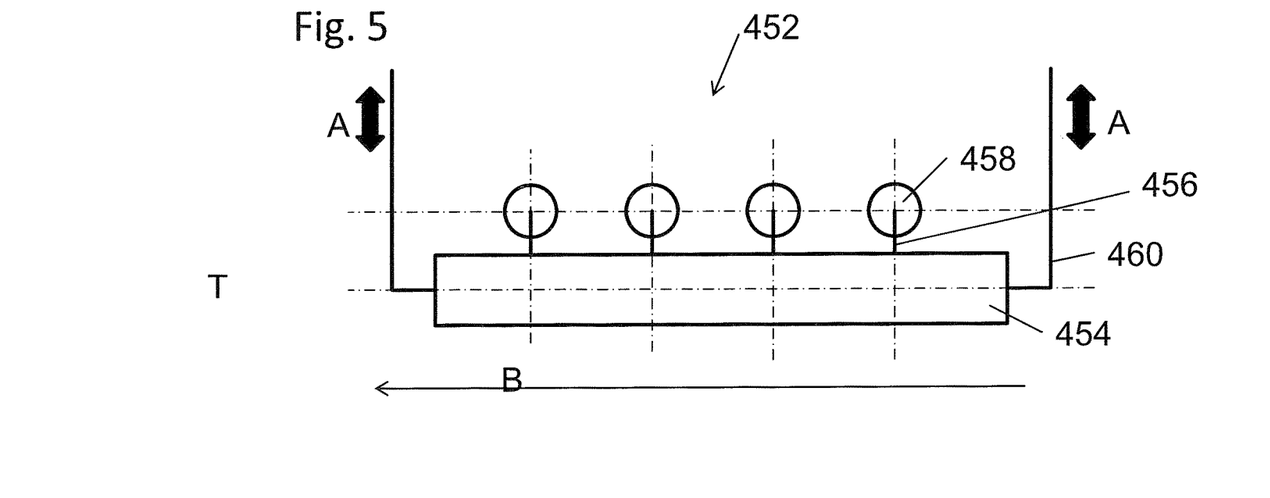
FIG. 5 shows in a schematic view a fifth embodiment of a bonding tool of the present invention.
Figure 5A:
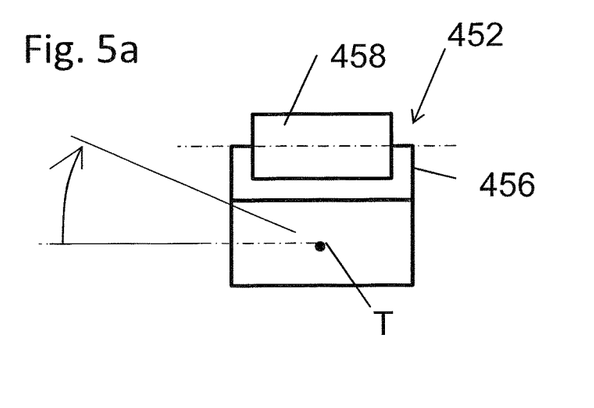
FIG. 5a is a side view of FIG. 5, with the bonding tool being in the first working position.

In FIG. 5, a fifth embodiment of the present invention is shown. FIG. 5a shows a side view of FIG. 5. A bonding tool 452 comprises a heating bar 454 to which at least one rolling element, in particular four rolling elements, are connected by a guide lever 456, each. The rolling element corresponds to a pressurizing roller 458, which is rotationally movably mounted to guide lever 456. Heating bar 454 itself is connected to a tool frame 460, that is hinged to the actuator being adapted to move bonding tool 452 in at least direction A being substantially normal to feeding direction B. Furthermore, bonding tool 452, in particular heating bar 454 together with pressurizing roller 458 mounted thereon are rotatable around longitudinal axis T of bonding tool 452 being parallel to feeding direction B. For processing the method of heat sealing bonding, heating bar has to be opposite to tubular packaging casing 70 to be bonded. Heating bar 454 is heated up to a predetermined temperature, needed for heat sealing bonding of the edge areas of tubular packaging casing 70, which is controlled by the device for controlling. This first working position of bonding tool 452 is shown in FIGS. 5 and 5a.

With bonding tool 452 being in the first working position, as shown in FIG. 5a, heating bar 454, provided on bonding tool 452, is opposite film web 14 for performing the heat sealing bonding.

Figure 5B:
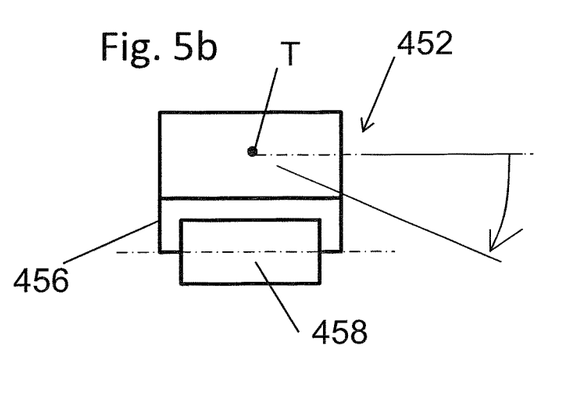
FIG. 5b is a side view of FIG. 5, with the bonding tool being in the second working position.

With bonding tool 452 being in the second working position, shown in FIG. 5b, the adhesive bonding is performed. For processing the adhesive bonding, it is obligatory, that pressurizing rollers 458 are opposite to—and in contact with—the edge areas of tubular packaging casing 70 to be bonded. Bonding tool 452 therefore has to be in the second working position, which is shown in FIG. 5b. Pressurizing rollers 458 are pressed onto tubular packaging casing 70 to be bonded. For this purpose, the actuator that moves tool frame 460 in direction A substantially normal to feeding direction B applies the pressure needed for exerting curing pressure onto the edge areas, onto heating bar 454 to which pressurizing rollers 458 are connected via guide levers 456.

As can be seen in FIGS. 5, 5a and 5b, the working sides on bonding tool 452 providing heating bar 454 and pressurizing rollers 458 are spaced apart by 180° rotational angle around longitudinal axis T of bonding tool 452. However, it lies in the scope of the present embodiment, that the rotational angle around longitudinal axis T spacing the first and the second working side on bonding tool 452 apart from each other, may be more or less than 180°.

The adjustment of bonding tool 452 in terms of height and angular position while removing adhesive residuals by means of the brush or bristle is performed by the actuator actuating tool frame 460 and a pivoting actuator as can be seen best in FIG. 4.

Figure 6:
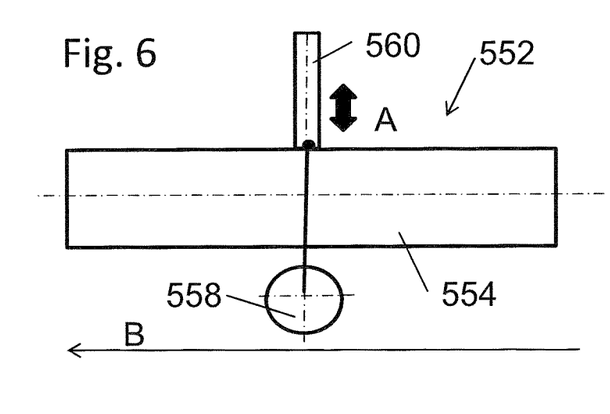
FIG. 6 shows in a schematic view a sixth embodiment of a bonding tool according to the present invention.
Figure 6A:
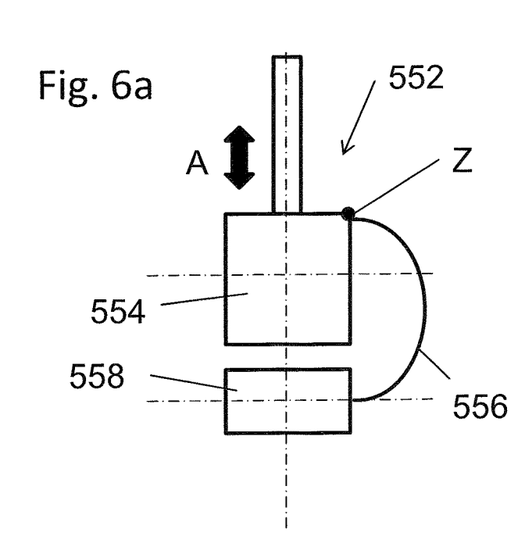
FIG. 6a is a side view of FIG. 6, with the bonding tool being in its second working position.
Figure 6B:
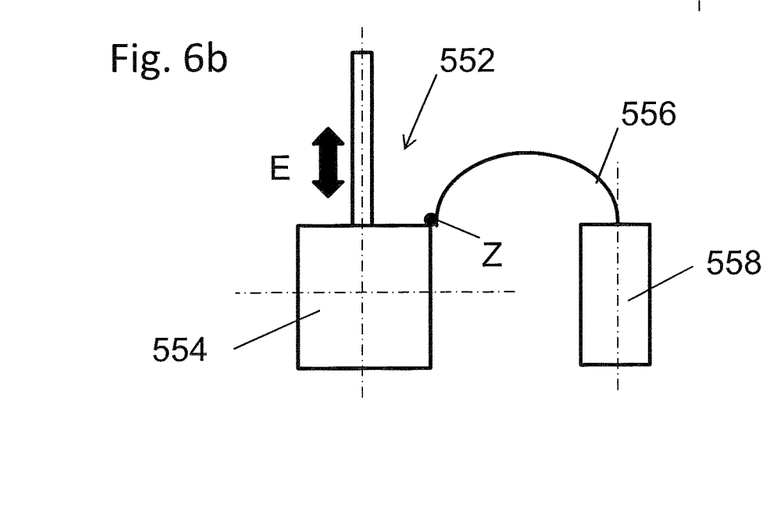
FIG. 6b is a side view of FIG. 6, with the bonding tool being in its first working position.

A sixth embodiment of the present invention is shown in FIGS. 6, 6a and 6b, wherein FIG. 6a shows a side view of FIG. 6 with a bonding tool 552 being in the second working position, and FIG. 6b shows a side view with the bonding tool 552 being in the first working position. Bonding tool 552 comprises a heating bar 554 being connected to at least one pressurizing roller 558 by means of at least one guide lever 556. Guide lever 556 is rotatably connected to heating bar 554 and can be rotated around a rotation axis Z, wherein pressurizing roller 558 is rotationally moveably connected to guide lever 556. Furthermore, heating bar 554 is hinged onto a tool frame 560 which is actuatable by an actuator to at least move in direction A substantially normal to feeding direction B.

An adjustment of bonding tool 552 in the first or second working position can be performed by a pivoting movement of guide lever 556 connected to pressurizing roller 558 around rotation axis Z together with a movement of bonding tool 552 along direction A.

As already mentioned above, in FIGS. 6 and 6a, bonding tool 552 is in the second working position. The rotating axis of pressurizing roller 558 is arranged across to feeding direction B. The curing pressure needed for the adhesive bonding process is applied by pressurizing roller 558 contacting the edge areas of tubular packaging casing 70 to be bonded. Tool frame 560, actuated and guided by the actuator, puts pressure onto heating bar 554, wherein heating bar 554 pressurizes pressurizing roller 558 via guide lever 556. If the adhesive bonding shall be terminated and film web 14 shall be bonded by heat sealing, the working position must be changed from the second to the first working position.

The change of working positions follows the procedure already explained with FIGS. 2, 3 and 4. The device for controlling controls the movement of bonding tool 552 into its first working position. Therefore, pressurizing roller 558 is rotated around rotation axis Z. FIG. 6b shows the first working position of bonding tool 552, wherein heating bar 554 is opposite the edge areas of tubular packaging casing 70 to be bonded. Depending from the adhesive residual signal, a potential adhesive residual sticking on pressurizing roller 558 and/or heating bar 554 is removed from bonding tool 552. This removal can be performed by brushes, bristles, or even manually by operating personal as already mentioned above. As soon as adhesive residuals are removed successfully, a signal indicating a successful removal is provided to the device for controlling.

In the following, heating bar 554 is heated up onto the temperature predetermined for heat sealing bonding, which is controlled by the device for controlling.

REFERENCE SIGNS

10 Film web providing/forming station
12 Film web roller
14 Film web
16a First Roller
16b Second Roller
16c Third Roller
18 Tensioning roller
20 Forming means
22 Filling tube
50 Bonding station
52 Bonding tool
54 Heating/pressurizing bar
70 Tubular packaging casing
80 Filling and clipping station
82 Sausage
84 Clip
86 End portion
88 First end
A Direction
B Feeding direction
T Longitudinal axis
152 Bonding tool
154 Heating/pressurizing bar
156 Guide roller
158 Heating/pressurizing tape
160 Tension element
d Distance
C Moving direction of heating/pressurizing bar
D Moving direction of Tension element
E Tape moving direction
252 Bonding tool
254 Heating/pressurizing roller
256 Guide lever
258 Roller shaft
352 Bonding tool
354 Heating/pressurizing roller
356 Guide lever
358 Guide bar
P Pivoting axis
452 Bonding tool
454 Heating bar
456 Guide lever
458 Pressurizing roller
460 Tool frame
552 Bonding tool
554 Heating bar
556 Guide lever
558 Pressurizing roller
560 Tool frame
Z Rotation axis

What is claimed is:

1. A method for producing a tubular packaging casing, comprising:
    feeding a film web from a film web storage unit in a feeding direction to a forming unit for forming a tubular casing having edge areas which extend in the feeding direction and which are arranged adjacent to each other, and
    bonding the edge areas together in a bonding station having one bonding tool,
    wherein the bonding tool is moved between a first working position and a second working position for carrying out a respective one of two alternative processes of firmly bonding the edge areas of the tubular casing together in each of the first and second working positions.

2. The method as claimed in claim 1,
    wherein one of the two alternative processes of firmly bonding is a heat sealing bonding process.

3. The method as claimed in claim 1,
wherein one of the two alternative processes of firmly bonding is an adhesive bonding process.

4. The method as claimed in claim 1,
wherein, in the first working position, the bonding tool does not contact the edge areas of the tubular casing.

5. The method as claimed in claim 1,
wherein, in the second working position, the bonding tool contacts the edge areas of the tubular casing.

6. The method as claimed in claim 5,
wherein, in the second working position, the bonding tool exerts a pressure in a direction transverse to the feeding direction of the film web onto the edge areas of the tubular casing.

7. The method as claimed in claim 5, wherein in the second working position, an adhesive is used to bond the edge areas of the tubular casing together,
and wherein, when the bonding tool is moved from the second working position to the first working position, residuals of the adhesive are removed from the bonding tool.

8. The method as claimed in claim 1,
wherein, for moving the bonding tool between the first and second working positions, the bonding tool is rotated along a longitudinal axis thereof extending parallel to the feeding direction of the film web.

9. The method as claimed in claim 1,
wherein, for moving the bonding tool between the first and second working positions, the bonding tool is pivoted around a transverse axis thereof extending transverse to the feeding direction of the film web.

10. An apparatus for producing a tubular packaging casing, comprising:
a film web storage unit for accommodating a supply of a film web,
a forming unit for forming a tubular casing out of the film web being fed from the film web storage unit in a feeding direction to the forming unit, wherein the tubular casing has edge areas which extend in the feeding direction and which are arranged adjacent to each other,
a bonding station having at least one bonding tool, wherein the bonding tool is moved between a first working position and a second working position for carrying out a respective one of two alternative processes of firmly bonding the edge areas of the tubular casing together in each of the first and second working positions.

11. The apparatus as claimed in claim 10,
wherein the bonding tool in the first working position has a first height measured from the tubular casing in a direction normal to the feeding direction of the film web and wherein the bonding tool in the second working position has a second height measured from the tubular casing in a direction normal to the feeding direction, wherein the second height is smaller than the first height.

12. The apparatus as claimed in claim 10,
wherein the bonding tool in the first working position bonds the edge areas of the tubular casing by a heat sealing method.

13. The apparatus as claimed in claim 12,
wherein at least one temperature sensor is provided for detecting the temperature of the bonding tool and/or the temperature of the edge areas of the tubular casing just bonded.

14. The apparatus as claimed in claim 10,
wherein the bonding tool of the bonding station in the second working position applies a pressure onto the edge areas of the tubular casing in an adhesive bonding process in which a strip of adhesive is used to bond the edge areas of the tubular casing.

15. The apparatus as claimed in claim 14,
wherein the bonding tool comprises at least one rolling element which is rotatably held in the bonding tool in the second working position with a rotating axis being arranged to extend transverse to the feeding direction of the film web, and which applies a pressure onto the edge areas of the tubular casing.

16. The method as claimed in claim 8,
wherein, in case of changing the working positions, the bonding tool is pivoted around a transverse axis thereof extending transverse to the feeding direction of the film web.

* * * * *